United States Patent [19]
Haubs et al.

[11] Patent Number: 5,894,072
[45] Date of Patent: Apr. 13, 1999

[54] PROCESS FOR PREPARING AROMATIC SULFUR-CONTAINING POLYMERS

[75] Inventors: Michael Haubs, Bad Kreuznach; Reinhard Wagener, Flörsheim, both of Germany

[73] Assignee: Hoechst Aktiengesellschaft, Frankfurt, Germany

[21] Appl. No.: 08/822,112

[22] Filed: Mar. 21, 1997

[30] Foreign Application Priority Data

Mar. 25, 1996 [DE] Germany .......................... 196 11 681

[51] Int. Cl.$^6$ .................................................. C08G 75/14
[52] U.S. Cl. ................................................... 528/388
[58] Field of Search ........................................ 528/388

[56] References Cited

U.S. PATENT DOCUMENTS

| | | |
|---|---|---|
| 4,786,711 | 11/1988 | Senatore et al. . |
| 4,794,164 | 12/1988 | Iwasaki et al. ............... 528/388 |
| 4,814,430 | 3/1989 | Iwasaki et al. . |
| 4,910,294 | 3/1990 | Ogata et al. . |
| 5,171,831 | 12/1992 | Nesheiwat et al. ............ 528/388 |
| 5,688,908 | 11/1997 | Haubs et al. . |

FOREIGN PATENT DOCUMENTS

| | | |
|---|---|---|
| 0244187 | 11/1987 | European Pat. Off. . |
| 0 256 757 | 2/1988 | European Pat. Off. . |
| 0 259 984 | 3/1988 | European Pat. Off. . |
| 0446057 | 9/1991 | European Pat. Off. . |
| 737705 | 10/1996 | European Pat. Off. . |

OTHER PUBLICATIONS

"Textbook of Polymer Science," F.W. Billmeyer, Jr., Ed., pp. 338–343, Interscience Publishers, John Wiley and Sons, New York (1963).

*Primary Examiner*—Robert Dawson
*Assistant Examiner*—D. Aylward
*Attorney, Agent, or Firm*—Frommer, Lawrence & Haug LLP

[57] ABSTRACT

In a process for preparing aromatic sulfur-containing polymers, the polymer is formed from a prepolymer having halogen end groups. During preparation of the prepolymers, an alkali equivalent and a sulfur equivalent in a ratio of 0.5 to 1:1 is employed in the reaction mixture. The two-step process is particularly suitable for preparing polyphenylene sulfide.

17 Claims, No Drawings

PROCESS FOR PREPARING AROMATIC SULFUR-CONTAINING POLYMERS

The invention relates to a process for preparing linear or branched aromatic sulfur-containing polymers, such as polyarylene sulfides, in particular polyphenylene sulfide (PPS).

Aromatic sulfur-containing polymers, in particular polyarylene sulfides and polyphenylene sulfide (PPS), are distinguished by exceptional thermal stability and excellent chemical resistance and are therefore of great interest for industrial applications.

The preparation of PPS is described, for example, in U.S. Pat. No. 4,910,294, in which it is prepared from phenylene dihalides, in particular dichlorobenzene (DCB), and sodium sulfide in a high-boiling, dipolar aprotic solvent such as methylpyrrolidone (NMP). The reaction temperatures are in the range from 220° C. to 270° C., and the reaction times are in the range from 5 to 12 h. However, it is not easy to achieve sufficiently high molecular weights for industrial applications. The problem is overcome by subjecting the polymers to a "crosslinking (curing) process" or by adding trifunctional comonomers such as trichlorobenzene to the reaction mixture. The polymers are then, however, branched, which is frequently disadvantageous for use, for example because toughness is reduced.

Another way of achieving high molecular weights is the addition of water in a second reaction stage and the heating of the reaction mixture to 260° C. This can also be carried out in a two-stage process (EP 0256757, EP 0259984, U.S. Pat. No. 4,794,164), but in this case large amounts of water must be added (from 6 to 15 mol of water per kg of solvent) so that a two-phase system forms. These processes have, however, the disadvantage that long reaction times are required, the solvent partially decomposes (formation of methylamine), and furthermore, other undesired by-products are formed.

The isolation and purification of the polymers are likewise achieved only to an unsatisfactory extent, because some of the salt which is also formed in large amounts is enclosed by the polymer and can be removed only by extensive washing procedures. For removing volatile impurities, which greatly impair extrusion of a melt, it is necessary either to carry out costly washing with large amounts of organic solvents or to crosslink the isolated polymer at elevated temperature, which greatly detracts from its purity. In all cases, the removal of the volatile impurities is very incomplete. This also causes the emission of undesirable constituents into the environment on extrusion of the melt, especially when spinning fibers. EP-A-0527055 describes the preparation of high-molecular-weight PPS by ring-opening polymerization of cyclic PPS oligomers. It is, however, difficult to prepare larger amounts of PPS in this manner, since cyclic oligomers are not easy to prepare in good yield.

U.S. Pat. No. 4,786,711 describes reaction conditions for preparing easy-flowing, low-molecular-weight PPS where alkali metal hydroxide and alkali metal bisulfide are present in the reaction mixture in a molar ratio of from 0.8 to 0.98.

In the prior art, the stability of the melt viscosity (melt stability) of the polymers is likewise not very satisfactory, and stabilizers are therefore added in various amounts.

Finally, large amounts of solvents have to be reclaimed and purified by distillation, which makes work-up of the polymer very costly. In overall terms, the preparation of high-molecular-weight, pure PPS according to the prior art is time-consuming, the isolation and purification of the polymer is complicated and costly and the quality of the polymer is unsatisfactory.

The object was, therefore, to avoid the disadvantages mentioned.

The invention relates to a process for preparing an aromatic sulfur-containing polymer, which comprises preparing, in a first step, in at least one solvent, a prepolymer containing halogen-terminated groups from A) at least one aromatic dihalogenated hydrocarbon and B) at least one sulfide of an alkali or alkaline earth metal or hydrates thereof, where the ratio of alkali equivalent to sulfur equivalent in the reaction mixture is from 0.5 to 1:1, and isolating the prepolymer, and, in a second step, forming the polymer by addition of a small quantity of component B) in homogeneous solution.

In the process, halogen-terminated oligomers or polymers containing arylene sulfide units are prepared, and these products, the so-called prepolymer, are converted into a sulfur-containing polymer having a molecular weight higher than that of the prepolymer by reaction with sulfide or with an equivalent sulfur compound. It is also possible to design the process as a single step by not first preparing the prepolymer, but instead using a halogen-terminated prepolymer as starting material for preparing the polymer having higher molecular weight. The aromatic sulfur-containing polymers obtained, in particular polyarylene sulfides in a wide range of molecular weights (e.g. $M_n$ from 5,000 to 100,000 g/mol), can be prepared in high purity using short reaction times, and the effort required for polymer isolation and solvent reclamation is small.

Alkaline equivalent, abbreviated to EQL, means the following quantity:

EQL=n(sulfide)+n(hydroxide)−n(acid), where:

n(sulfide) is the molar amount of sulfide employed, n(hydroxide) is the molar amount of hydroxide employed, n(acid) is the molar amount of added protonic acid equivalents employed.

The amount of protonic acid equivalents is the mass of acid employed divided by its equivalent weight. For example, for sulfuric acid, which is dibasic, n(acid)=mass of sulfuric acid/49 gmol$^{-1}$. The protonic acid equivalent depends on the number of active protons. Thus, the equivalent weight of hydrogen sulfide is 34 gmol$^{-1}$.

Sulfur equivalent, shortened to EQS, means the following quantity:

EQS=n(sulfide)+n(bisulfide)+n(hydrogen sulfide), where:

n(sulfide) is the molar amount of sulfide employed, n(bisulfide) is the molar amount of bisulfide employed, n(hydrogen sulfide) is the molar amount of added hydrogen sulfide employed.

In the process, it is advantageous to prepare and isolate, in a first stage, a prepolymer having halogen end groups and, in a second stage, to convert the prepolymer, by reaction with a sulfur compound, to a polymer having higher molecular weight.

Sulfur-containing polymers are polymers which contain arylene sulfide units. The arylene components of the arylene sulfide units contain mono- or polycyclic aromatics or compound aromatics. The aromatics can also contain heteroatoms. Aromatics of this type, which can be substituted or unsubstituted, are, for example, benzene, pyridine, biphenyl, naphthalene or phenanthrene. Substituents are, for example, $C_1$–$C_6$-alkyl, $C_1$–$C_6$-alkoxy, carboxyl, amino or sulfonic acid groups. Compound aromatics are, for example, biphenyl or aromatics linked by ether bridges (arylene ethers).

Preferred sulfur-containing polymers are polyarylene sulfides, in particular polyphenylene sulfide.

The term prepolymer includes halogen-terminated oligomers or polymers containing arylene sulfide units. These products usually have a molecular weight, expressed as number average $M_n$, in the range from 500 to 20,000 g/mol. They can be prepared by reaction of a sulfur compound, in particular inorganic sulfides, with an excess of halogenated aromatic hydrocarbons, for example by reaction of sodium sulfide with a from 5 to 50% molar excess of p-dichlorobenzene in NMP as solvent. They can be linear or branched. It is possible also to prepare substituted prepolymers by employing substituted dihaloaryl compounds (e.g. 2,5-dichlorotoluene). The prepolymers have a content of organically bound halogen in the range from 0.2 to 10 percent by weight; typically, the halogen content is from 0.5 to 5 percent by weight, depending on the molecular weight. The presence of halogen-terminated oligomers or polymers is confirmed experimentally by their number average molecular weight, by their halogen content and by their $^1$H-NMR spectra. The halogens fluorine, chlorine, bromine and iodine, preferably chlorine or bromine, especially preferably chlorine, are suitable as halogen end groups.

Suitable sulfur-containing compounds for preparing the prepolymers and the polymers are organic and inorganic sulfides. Inorganic sulfides are sulfides of alkali metals and of alkaline earth metals, such as lithium sulfide, potassium sulfide, calcium sulfide and preferably sodium sulfide. An organic sulfide is, for example, the adduct of hydrogen sulfide and 1,8-diazabicyclo[5.4.0]undec-7-ene (DBU). It is formed from DBU and $H_2S$ in a molar ratio of 2:1. The salts can be added as such or prepared in situ; for example, the preferred sodium sulfide is formed from sodium bisulfide and sodium hydroxide. The sulfides can also be employed in their form containing water of crystallization. It has been found that, for the first step, approximately from 1 to 1.8 mole of water per mole of sulfide is advantageous.

Suitable halogenated aromatic hydrocarbons are arylene dihalides, inter alia dihalobenzenes, such as o-, m- and p-dichlorobenzene, substituted dihalobenzenes, such as 2,5-dichlorotoluene, 3,5-dichlorobenzoic acid, 2,5-dichlorobenzenesulfonic acid or 3,5-dichlorobenzenesulfonic acid, or their salts. Dihalonaphthalenes, such as 1,4-dibromonaphthalene, or dihalodiphenyl ethers, such as 4,4'-dichlorodiphenyl ether, can also be employed. Likewise, mixtures of different arylene dihalides can be employed. Small amounts (from 0.2 to 5 mol percent based on arylene dihalide) of polyhalogenated aromatic hydrocarbons can be employed in order to obtain at branched or crosslinked sulfur-containing polymers.

Suitable solvents for preparing the prepolymer and the polymer in the second step are dipolar aprotic solvents of the amide type, such as dimethylformamide (DMF), dimethylacetamide (DMAc), N-methylcaprolactam or N-alkylated pyrrolidones, or mixtures thereof. NMP is particularly preferred. Under the reaction conditions of the first and second process steps, the prepolymer is in solution.

In the novel process, the ratio of alkali equivalent to sulfur equivalent during preparation of the prepolymers is in the range from 0.5 to 1:1, preferably from 0.8 to 1:1. This gives a number of advantages. In particular, solid/liquid separation during isolation of the prepolymers is considerably simplified. When the reaction has finished and the reaction mixture has cooled, a flowable suspension is formed which is capable of being conveyed using conventional industrial methods. The solid/liquid separation of the flowable suspension can be carried out directly, without preparatory steps, by basic chemical engineering operations such as decanting, centrifuging, filtration or immediate flash evaporation of the solvent. If, on the other hand, a hydroxide excess is used, the reaction product is frequently a cake, which may be semi-solid or completely solid. In this case, removal of these reaction mixtures from the reaction vessel and their transfer into downstream equipment causes considerable difficulties or becomes possible only on subsequent dilution of the reacted mass, which again makes the overall separation processes more complicated. The separation itself likewise becomes increasingly difficult and inefficient as the viscosity of the reaction mixture increases. Reaction products in the form of suspensions, prepared according to the present invention, can be separated into their solid and liquid constituents considerably more quickly and more efficiently. If the solid/liquid separation is carried out, for example, by filtration, the novel process gives significantly higher filtration rates.

The use of, at the most, equal alkali equivalents based on sulfur equivalents furthermore improves the targeted preparation of prepolymers having chlorine end groups. When prepolymers are being prepared, these chlorine end groups are desirable for subsequent condensation. Furthermore, chlorine-terminated polymer chains have the best thermal stability and oxidation resistance.

The novel process is described below for the example of the preparation of polyphenylene sulfide (PPS), but is not restricted thereto. The use of a titanium autoclave is advantageous, but not essential.

For preparing the prepolymer, an inorganic sulfide, preferably a sulfide of an alkali metal, particularly preferably sodium sulfide, is reacted with excess p-dichlorobenzene (DCB). The excess of DCB in relation to sulfide is 5 mol % or more, preferably from 10 to 100 mol %, in particular from 10 to 50 mol %. Sodium sulfide is employed in its anhydrous form or in the form of its crystalline hydrates. It can also be prepared in situ from sodium hydroxide and sodium bisulfide. There are several ways of producing an EQL/EQS value in the range according to the invention of from 0.5 to 1. It is possible, for example, to use sodium bisulfide in an excess in relation to sodium hydroxide, so that EQL/EQS is given simply by the quotient of the molar concentrations [NaOH]/[NaSH].

It is also possible to use alkali metal sulfide with addition of a protonic acid, for example sodium sulfide with from 0 to 50 mol %, preferably from 0.5 to 20 mol %, of a protonic acid. EQL/EQS is then given by EQL/EQS=|$Na_2S$|−|acid|/|$Na_2S$|. Suitable acids are mineral acids, such as sulfuric acid, hydrochloric acid and phosphoric acid, also carboxylic acids, such as acetic acid and propionic acid, also polyfunctional carboxylic acids, such as tartaric acid and citric acid. Other compounds having acid protons, $H_2S$ for example, can be advantageously employed.

In order to set the optimum water content of the reaction mixture of from 1 to 1.8 mol of water per mole of sulfide, a distillative dehydration can be carried out before the actual reaction, in order to remove water of crystallization from $Na_2S$, NaOH or NaSH. If anhydrous reactants are employed, the calculated amount of water can be added subsequently. The reactants can be added batchwise by precharging and dehydrating the sulfide, then adding DCB and warming the reaction mixture to reaction temperature. It is also possible, however, to meter in both reactants slowly, so that the metering rate controls the liberation of the heat of reaction.

The reaction conditions for the first step can be varied within wide limits. Thus, the reaction temperatures can be between 180° C. and 270° C., preferably from 220° C. to 250° C. The reaction times can be from 20 minutes to 20 hours, preferably from 1 to 3 hours. Temperature programs can also be used advantageously, for example 30 minutes at 225° C. and then 1 hour at 245° C.

The reaction mixture from the first step can be worked up in various ways:

The prepolymer can be separated by cooling of the reaction mixture to temperatures below 200° C. and simple filtration under pressure. The filter cake contains the prepolymer and sodium chloride. The sodium chloride can be removed by washing with water.

It is also possible to work up the reaction mixture by flash evaporation or spray drying, thus removing NMP and p-dichlorobenzene. PPS and sodium chloride are produced as a substantially dry solid mixture from which the sodium chloride can be washed out.

Pressure filtration of the hot (220–240° C.) reaction mixture is also advantageous, the sodium chloride being separated off as filter residue. The filtrate contains the dissolved prepolymer, which crystallizes out on cooling of the filtrate to below 200° C., and can easily be separated by simple filtration (e.g. filtration using suction). The solvent filtered off can be re-used for preparing prepolymer.

To prepare the polymer, the prepolymer is dissolved in NMP under superatmospheric pressure at 230° C. and reacted with sodium sulfide in homogeneous solution. It is expedient if the concentration of the prepolymer is as high as possible. It can be in the range from 15 to 90 percent by weight, preferably from 20 to 60 percent by weight, in particular from 30 to 50 percent by weight. The amount of added sodium sulfide determines the molecular weight of the polymers. If the molecular weight is plotted as a function of the ratio of the masses of sodium sulfide and prepolymer, there is a distinct maximum at a ratio of sodium sulfide/prepolymer given by the following equation:

$$m(Na_2S)=m(PP) \times P_{Cl}$$

in which:

m ($Na_2S$) is the mass of the added sodium sulfide (anhydrous)

m (PP) is the mass of prepolymer employed $P_{Cl}$ is the proportion by weight of organically bonded chlorine in the prepolymer, i.e. the ratio of masses of bonded chlorine/prepolymer (e.g.: 2 percent by weight=0.02).

For typical prepolymers having a content of organically bonded chlorine in the range from 0.2 to 10% by weight, preferably from 0.5 to 5 mol %, the calculated amount of sodium sulfide for preparing the polymer is only a very small percentage by weight. Under the reaction conditions, both the prepolymer and the polymer are homogeneously dissolved in the solvent and sodium sulfide hydrate in the small concentrations used is likewise largely soluble. The reaction therefore proceeds virtually in homogeneous solution by the reaction of two homogeneously dissolved reactants. Separation of the reaction mixture into two phases is not desirable and is not advantageous for fast and complete conversion of the reactants. Only the sodium chloride which arises in the course of the conversion of halogen-terminated prepolymers to the end polymer is insoluble in the solvent. In every case, however, the proportion of this single component which is present as undissolved solid in the reaction mixture is at most 10% by weight, based on the entire reaction mass.

The reaction temperatures in the second stage are in the range from 220 to 260° C., preferably from 230 to 255° C., and the reaction times are 30 minutes to 5 hours, preferably from 1 to 3 hours. At the end of the reaction, the polymer is in the form of an almost clear, viscous solution, out of which it crystallizes on cooling. The PPS which crystallizes out can be isolated easily by simple filtration, and can be freed from residues of mother liquor by washing with NMP. After washing with warm water, the polymer is dried.

The melting points of the polyphenylene sulfides are in the range from 270° C. to 305° C., typically from 280 to 295° C. The melt viscosity is in the range from 5,000 to 500,000 mPas (centipoise), preferably in the range from 50,000 to 250,000 mPas (centipoise). The melt viscosity is stable without additives: at 300° C., it changes by less than 10% over a period of 1 hour.

The aromatic sulfur-containing polymers prepared according to the invention can be converted into shaped articles by melt extrusion. Films and fibers having good mechanical properties can also be produced.

EXAMPLES

Example 1

Comparative Example 850 ml of NMP, 30 ml of water, 256 g (2 mol) of sodium sulfide 2.8-hydrate and 0.8 g (0.02 mol) of sodium hydroxide are precharged to a 2-liter titanium autoclave. The ratio of alkali equivalent (EQL) to sulfur equivalent (EQS) is 1.01. The mixture is heated to T=190° C. with stirring, and 145 ml of water containing NMP is distilled off. The mixture is cooled to T=170° C., and 370 g of p-dichlorobenzene and 50 ml of NMP are added. The autoclave contents are heated to T=230° C. with stirring and held at that temperature for 2 hours. 55 ml of a water/NMP mixture and 18 ml of p-dichlorobenzene are then distilled off. The temperature is lowered to T=185° C. and held there for 90 minutes, then the autoclave is opened to give a very highly viscous reaction mixture which does not easily flow out of the reaction vessel. An attempt to separate the crystalline prepolymer and the sodium chloride from the adhering mother liquor by filtration fails because the filtration rate is extremely low. The reaction mixture is finally stirred into 4 l of acetone and only then is a filtration carried out, followed by one further acetone wash and three washes with hot water. The dried prepolymer is oxidized quantitatively to polyphenylene sulfoxide by dissolution in 85 percent (% by weight) strength nitric acid, and then characterized by NMR spectroscopy. A broad singlet is observed at 7.4 ppm, which derives from the 1,4-sulfoxide-disubstituted phenylene rings of the polymer chain. The two doublets at 7.15 ppm and 7.05 ppm of the terminal phenylene rings having a 1-chloro-4-sulfoxide substitution pattern, characteristic of chlorine-terminated prepolymers, are, in contrast, absent. (The precise chemical shift is dependent on the exact acid strength of the $HNO_3$, whose signal is evident at δ=9.1 ppm.)

Example 2

850 ml of NMP, 30 ml of water and 256 g (2 mol) of sodium sulfide 2.8-hydrate are precharged to a 2-liter titanium autoclave. The mixture is heated with stirring to T=195° C. and then 145 ml of water containing NMP are distilled off. The autoclave contents are cooled to T=170° C., and a mixture of 367 g of p-dichlorobenzene, 50 ml of NMP and 1.2 g (0.02 mol) of glacial acetic acid is added. The ratio of alkali equivalent (EQL) to sulfur equivalent (EQS) is 0.99. The autoclave is heated to T=230° C. and held at that temperature for 2 hours. 27 ml of a water/NMP mixture and 18 ml of p-dichlorobenzene are then distilled off. The temperature is lowered to T=185° C. and held there for 90 minutes, then the autoclave is opened. The suspension, which flows easily, is poured into a Büchner funnel and filtered through a cellulose filter. The standardized filtration rate, based on filtrate volume, is 160 l/m²h. The filter cake is washed with acetone and washed three times with hot water, and then dried. The NMR spectrum of the sulfoxide oxidation product of the PPS prepolymer shows, in addition to the main peak at 7.40 ppm, the two doublets at 7.15 ppm and 7.05 ppm which are characteristic of terminal chlorine groups. The mean molecular weight of the prepolymer, determined from the ratio of intensities of the main peak and the doublets, is $M_n$=5,800 g/mol.

Example 3

850 ml of NMP, 30 ml of water and 307 g (2.4 mol) of sodium sulfide 2.8-hydrate are precharged to a 2-liter titanium autoclave. The mixture is heated with stirring to T=200° C. and 162 ml of water containing NMP are then distilled off. The autoclave contents are cooled to T=170° C., and 440 g of p-dichlorobenzene and 50 ml of NMP are added. In this experiment, the ratio of alkali equivalent (EQL) to sulfur equivalent (EQS) is 1.0. The reaction mixture is heated to T=230° C. with continued stirring, and the reaction is carried out for 2 hours at this temperature. 30 ml of a water/NMP mixture and 19 ml of p-dichlorobenzene are then distilled off. The temperature is lowered to T=185° C. and held there for 90 minutes, then the autoclave is opened. The flowable suspension is filtered through a cellulose filter at T=185° C. The filtration rate, based on filtrate volume, is 190 l/m²h. The filter cake is washed with acetone and washed three times with hot water, and then dried. The NMR spectrum of the sulfoxide oxidation product of the PPS prepolymer shows, in addition to the main peak at 7.40 ppm, the two doublets at 7.15 ppm and 7.05 ppm which are characteristic of terminal chlorine groups. The mean molecular weight of the prepolymer, determined from the ratio of intensities of the main peak and the doublets, is $M_n$=6,200 g/mol.

Example 4

850 ml of NMP, 30 ml of water and 256 g (2 mol) of sodium sulfide 2.8-hydrate are precharged to a 2-liter titanium autoclave. The mixture is heated to T=200° C. with stirring and then 174 ml of water containing NMP are distilled off. The mixture is cooled to T=180° C., and 367 g of p-dichlorobenzene, 50 ml of NMP and 6 g (0.10 mol) of glacial acetic acid are added. In this experiment, the ratio of alkali equivalent (EQL) to sulfur equivalent (EQS) is 0.95. The autoclave is heated to T=230° C. with stirring, and the reaction is carried out at this temperature for 2 hours, then 37 ml of a water/NMP mixture and 58 ml of p-dichlorobenzene are distilled off. The temperature is lowered to T=175° C. and held there for 90 minutes, then the autoclave is opened. The suspension, which flows easily, is filtered through a cellulose filter at T=175° C. The filtration rate, based on filtrate volume, is 470 l/m²h. The filter cake is washed with acetone and washed three times with hot water, and then dried. The NMR spectrum of the sulfoxide oxidation product of the PPS prepolymer shows, in addition to the main peak at 7.40 ppm, the two doublets at 7.15 ppm and 7.05 ppm which are characteristic of terminal chlorine groups. The mean molecular weight of the prepolymer, determined from the ratio of intensities of the main peak and of the doublets, is $M_n$=6,200 g/mol.

Example 5

Preparation of High-molecular-weight PPS 31.2 g of prepolymer from Example 2 are suspended with stirring in 60 ml of NMP in a 250 ml glass autoclave and mixed with 0.63 g of $Na_2S \times 3H_2O$, 1.15 g of sodium acetate and 0.5 ml of $H_2O$, with exclusion of air. The mixture is then heated at 245° C. for 2 hours with stirring. The substantially homogeneous, viscous solution is cooled and diluted with 40 ml of NMP. The crystalline precipitate is filtered with suction, washed with NMP and briefly boiled in water. After filtration with suction, the polymer is dried. Yield: 95%.

The PPS has a melt viscosity of 177,000 mPas at 300° C. and a shear rate of 10 min⁻¹. After one hour at 300° C., the melt viscosity is 172,000 mPas. The melting point on heating for the first time is 293° C., the recrystallization temperature on cooling from the melt is 246° C. and the melting point on heating for the second time is 285° C.

We claim:

1. A process for preparing an aromatic sulfur-containing polymer, which comprises preparing, in a first step, in at least one solvent, a prepolymer containing halogen-terminated groups from A) at least one aromatic dihalogenated hydrocarbon and B) at least one sulfide of an alkali or alkaline earth metal or hydrates thereof, where the ratio of alkali equivalent to sulfur equivalent in the reaction mixture is from 0.5 to 1.1, isolating the prepolymer, and, in a second step, forming the polymer by addition of less than 10 weight %, based on the mass of prepolymer employed, of component B) in homogeneous solution.

2. The process as claimed in claim 1, wherein the aromatic sulfur-containing polymer contains arylene sulfide units.

3. The process as claimed in claim 2, wherein the aromatic sulfur-containing polymer is polyphenylene sulfide.

4. The process as claimed in claim 1, wherein the prepolymer includes from 0.2 to 10% by weight of organically bonded halogen.

5. The process as claimed in claim 4, wherein the prepolymer includes from 0.5 to 5% by weight of organically bonded halogen.

6. The process as claimed in claim 1, wherein the molecular weight $M_n$ of the prepolymer is from 500 to 20,000 g/mol.

7. The process as claimed in claim 1, wherein component A) is dichlorobenzene or dichlorobenzenesulfonic acid and component B) is sodium sulfide.

8. The process as claimed in claim 1, wherein dipolar aprotic compounds of the amide type are employed as solvent.

9. The process as claimed in claim 8, wherein the solvent is N-methylpyrrolidone.

10. The process as claimed in claim 1, wherein component A) is employed in an excess of 5 mol % or more relative to component B) during preparation of the prepolymer.

11. The process as claimed in claim 1, wherein the excess of component A) is from 10 to 50 mol % relative to component B).

12. The process as claimed in claim 1, wherein the concentration of the prepolymer in the second step is from 15 to 90% by weight.

13. The process as claimed in claim 12, wherein the concentration of the prepolymer is from 30 to 50% by weight.

14. The process as claimed in claim 1, wherein the addition of component B) in the second step is given by the following equation $$m(Na_2S) = m(PP) \times P_{Cl}$$

where m ($Na_2S$) is the mass of component B) (anhydrous), m (PP) is the mass of prepolymer employed and $P_{Cl}$ is the proportion by weight of organically bonded halogen in the prepolymer.

15. A polyarylene sulfide, prepared by the process as claimed in claim 1.

16. A polyarylene sulfide as claimed in claim 15, having a melt viscosity of from 5,000 to 500,000 mPas (centipoise) and a number average molecular weight $M_n$ of from 5,000 to 100,000 g/mol.

17. A shaped article, film or fiber produced from an aromatic sulfur-containing prepolymer as claimed in claim 1.

* * * * *